(12) United States Patent
Kleegrewe et al.

(10) Patent No.: US 8,281,705 B2
(45) Date of Patent: Oct. 9, 2012

(54) METHOD FOR DETECTING THE DRIVE TYPE OF AN ACTUATOR (II)

(75) Inventors: Thomas Kleegrewe, Minden (DE); Stefan Engelke, Haste (DE); Andreas Stelter, Minden (DE); Wolfgang Scholz, Minden (DE); Urs E. Meier, Wuerenlingen (CH); Detlef Pape, Nussbaumen (CH)

(73) Assignee: ABB AG, Mannheim (DE)

( * ) Notice: Subject to any disclaimer, the term of this patent is extended or adjusted under 35 U.S.C. 154(b) by 975 days.

(21) Appl. No.: 12/328,954

(22) Filed: Dec. 5, 2008

(65) Prior Publication Data

US 2009/0145291 A1     Jun. 11, 2009

(30) Foreign Application Priority Data

Dec. 6, 2007 (DE) .......................... 10 2007 058 776

(51) Int. Cl.
*F01B 31/12* (2006.01)
*F15B 9/10* (2006.01)
(52) U.S. Cl. ................................ 91/1; 91/368
(58) Field of Classification Search ............... 91/1, 361, 91/363 R, 368; 92/5 R
See application file for complete search history.

(56) References Cited

U.S. PATENT DOCUMENTS 7,856,333 B2 * 12/2010 Scholz ............................ 702/94
2008/0243422 A1 10/2008 Nolle et al.

FOREIGN PATENT DOCUMENTS

| DE | 42 39 635 C2 | 5/1994 |
| DE | 10 2007 015 111 | 10/2008 |
| GB | 2 272 771 A | 5/1994 |

OTHER PUBLICATIONS

Office Action (First German Examination Report) dated Aug. 31, 2010, issued in the corresponding German Application No. 10 2007 058 776.9-14.

* cited by examiner

*Primary Examiner* — Michael Leslie
(74) *Attorney, Agent, or Firm* — Buchanan Ingersoll & Rooney PC

(57) ABSTRACT

A method is disclosed for detecting the drive type of an actuator, e.g., a pneumatic actuator, having a positioner for operating a final control element in a process engineering plant. The actuator is connected to the positioner by a mounting set, the positioner comprising an electronic control unit, which uses a microcontroller to receive one or more input signals, and to output actuating signals to control the flow of gas to or from the chambers of a single-acting or double-acting pneumatic drive. The position feedback sensors are equipped with a rotational measuring system. During commissioning of the actuator, the relationship between the drive volumes and the position signal is found and compared with transfer characteristics of known drive types. Where there is a match between the transfer characteristic defined by the value pairs of the given actuator and one of the transfer characteristics of the known drive types, the identified drive type is assigned to the given actuator.

4 Claims, 1 Drawing Sheet

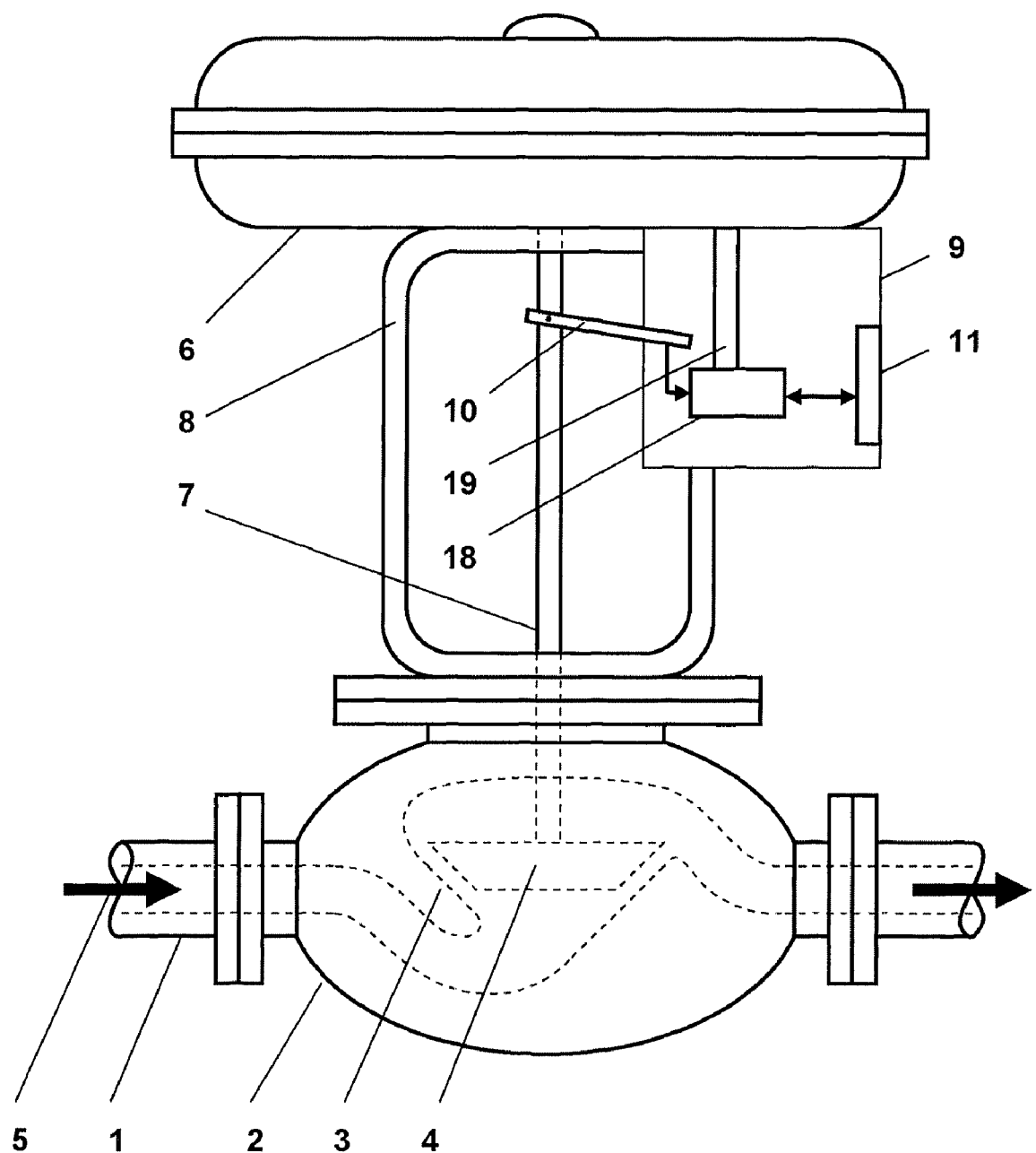

METHOD FOR DETECTING THE DRIVE TYPE OF AN ACTUATOR (II)

RELATED APPLICATION

This application claims priority under 35 U.S.C. §119 to German Patent Application No. DE 10 2007 058 776.9 filed in Germany on Dec. 6, 2007, the entire content of which is hereby incorporated by reference in its entirety.

TECHNICAL FIELD

The disclosure relates to a method for detecting the drive type of an actuator, e.g., a pneumatic actuator, having a positioner for operating a final control element in a process engineering plant.

BACKGROUND INFORMATION

The term "digital positioner" used in this disclosure stands for a mechatronic system, which controls the auxiliary power of a pneumatic actuator according to one or more input signals in order to bring the final control element into a particular position. The digital pneumatic positioner requires pressurized gas as the auxiliary power and electrical power in order to work.

The generic digital pneumatic positioner comprises at least the main components described in greater detail below. With a pneumatic system, the flow of gas to or from the chambers of a single-acting or double-acting pneumatic drive is controlled systematically as a function of one or more input signals. Using position feedback sensors, the movements and positions of the final control element are represented as one or more signals. In addition, there is an electronic control unit, which comprises a microcontroller and receives one or more input signals. The firmware in the electronic control unit processes the input signals and the signals from the position feedback sensors into output signals that are used as input signals to the pneumatic system.

The firmware of the digital positioner implements a function that analyses the dynamic properties of the connected actuator. At commissioning, the final control element is moved through its operating range once during an initialization process, and the initial value and final value of the operating range is recorded.

Actuators are classified as rotary or linear drives. In the linear drive, the linear movement of the drive of the actuator is transferred directly to a linearly actuated final control element. In contrast, in the rotary drive, the linear movement of the drive of the actuator is converted into a rotation by suitable means.

The actuator and the digital positioner are connected by a mounting set. The mounting set comprises components that transfer the movement and position of the actuator to the position feedback sensors of the positioner.

The known measuring systems of the position feedback sensors measure either linearly or rotationally, as known from DE 42 39 635 A1. If the effective direction of the actuator differs from the effective direction of the measuring system, the measurement must be linearized in order to ensure that positioning is performed sufficiently accurately. It is essential for this, however, to know in advance whether the given drive type is rotary or linear. For the known positioner, the operating person must provide this information by a manual setting during commissioning, which is prone to errors.

SUMMARY

Exemplary embodiments disclosed herein can identify the drive type automatically so as to use the same digital positioner without manual input.

A method for detecting the drive type of an actuator having a positioner for operating a final control element, the positioner comprising an electronic control unit, which uses a microcontroller to receive one or more input signals, and to output actuating signals to control the flow of gas to or from the chambers of a single-acting or double-acting pneumatic drive, with the pressure being monitored in at least one pneumatic fluid supply line to the chambers of the drive, and with the position of the final control element being signaled in the positioner by a rotational measuring system, wherein during commissioning, the actuator is moved over a definable distance within its operating range, the pressure in at least one pneumatic fluid supply line to the chambers of the actuator is monitored and recorded, the angle positions fed back by the position feedback sensors are recorded with the corresponding pressures, the drive volumes and the relationship between the drive volumes and the position signal are found from the fed back angle positions and the associated pressures, and are compared with transfer characteristics of known drive types, where there is a match between the transfer characteristic, defined by the relationship between the drive volumes and the position signal of the given actuator, and one of the transfer characteristics of the known drive types, the identified drive type is assigned to the given actuator.

In another aspect, an arrangement is disclosed for detecting a drive type of an actuator in a process engineering plant. Such an arrangement comprises a control element; a positioner for operating the control element, the actuator being connected to the positioner by a mounting set, the positioner comprising an electronic control unit, which uses a microcontroller to receive one or more input signals, and to output actuating signals to control the flow of gas to or from the chambers of a single-acting or double-acting pneumatic drive; and at least one position feedback sensor equipped with a rotational measuring system, wherein, during commissioning of the actuator, the relationship between drive volumes and a position signal is determined and compared with transfer characteristics of known drive types to identify the drive type to be assigned to the actuator.

BRIEF DESCRIPTION OF THE DRAWING

The subject matter of the disclosure will be explained in more detail in the following text with reference to an exemplary embodiment which is illustrated in the attached drawing, in which:

In the single FIGURE, a process valve 2 shown as a final control element is fitted in a pipeline 1, a section of which is shown.

DETAILED DESCRIPTION

The disclosure is based on the known actuator, which is connected to the positioner by a mounting set, the positioner comprising an electronic control unit, which uses a microcontroller to receive one or more input signals, and to output actuating signals to control the flow of gas to or from the chambers of a single-acting or double-acting pneumatic drive, with the pressure being monitored in at least one pneumatic fluid supply line to the chambers of the drive. The position feedback sensors are equipped with a rotational measuring system.

According to the disclosure, during commissioning, the actuator is moved over a definable distance within its operating range. At the same time, the pressure in at least one pneumatic fluid supply line to the chambers of the actuator is monitored and recorded. In addition, the angle positions fed back by the position feedback sensors are recorded with the corresponding pressures.

The drive volumes and the relationship between the drive volumes and the position signal are found from the fed back angle positions and the associated pressures. The value pairs made up of the drive volume and associated angle position of a given actuator are compared with the transfer characteristics of the known drive types. Where there is a match between the transfer characteristic defined by the value pairs of the given actuator and one of the transfer characteristics of the known drive types, the identified drive type is assigned to the given actuator.

The disclosure is explained in greater detail below with reference to an exemplary embodiment. In the single FIGURE, a process valve 2 as a final control element is fitted in a pipeline 1, a section of which is shown, of a process engineering plant, which is not shown further. Inside the process valve 2 is a closing body 4 that interacts with a valve seating 3 to control the amount of process medium 5 that passes through. The closing body 4 is operated linearly by a pneumatic actuator 6 via a lifting rod 7. The actuator 6 is connected to the process valve 2 via a yoke 8. A digital positioner 9 is mounted on the yoke 8. The travel of the lifting rod 7 is signalled to the positioner 9 via a position sensor 10. The detected travel is compared in an electronic control unit 18 with the setpoint value supplied via a communications interface 11, and the actuator 6 is controlled as a function of the determined control error. The electronic control unit 18 of the positioner 9 operates an I/P converter for converting an electrical control error into an appropriate control pressure. The I/P converter of the positioner 9 is connected to the actuator 6 via a pneumatic fluid supply line 19.

The position sensor 10 is connected inside the positioner 9 to the rotary shaft of a potentiometer and has an eyelet into which a drive pin on the lifting rod 7 engages.

During commissioning, the actuator 6 is moved over a definable distance within its operating range. At the same time, the pressure in at least one pneumatic fluid supply line 19 to the chambers of the actuator 6 is monitored and recorded. In addition, the angle positions fed back by the position sensor 10 are recorded with the corresponding pressures.

The drive volumes and the relationship between the drive volumes and the position signal are found from the fed back angle positions and the associated pressures.

For the drive type shown in the FIGURE, the drive volume V equals the product of the effective piston surface area A of the actuator 6 and the travel h of the lifting rod 7.

$$V = A*h$$

For the drive type shown in the FIGURE, the angle positions φ that can be detected from the potentiometer depend on the distance L of the rotary shaft of the potentiometer from the lifting rod 7 and the travel h of the lifting rod 7.

$$h = L*\tan\phi$$

This means that the drive volume V and the angle positions φ are related to each other by the tangent function and a design constant K=A*L.

$$V = K*\tan\phi$$

The value pairs made up of the drive volume V and associated angle position φ of a given actuator 6 hence follow a tangent function.

Other drive types having a different mechanical design each have a different transfer function of the drive volume V over the angle position φ, for example a linear transfer function, a sinusoidal function or a root function and combinations thereof.

The value pairs made up of the drive volume V and associated angle position φ are compared with the transfer characteristics of the known drive types. Where there is a match between the transfer characteristic defined by the value pairs of the given actuator 6 and one of the transfer characteristics of the known drive types, the identified drive type is assigned to the given actuator 6. A given actuator 6, whose value pairs follow a tangent function, is assigned the drive type shown in the FIGURE.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES 1 pipeline
2 process valve
3 valve seating
4 closing body
5 process medium
6 actuator
7 valve rod
8 yoke
9 positioner
10 position sensor
11 communications interface
18 electronic control unit
19 pneumatic fluid supply line

What is claimed is:

1. A method for detecting the drive type of an actuator having a positioner for operating a final control element, the positioner comprising an electronic control unit, which uses a microcontroller to receive one or more input signals, and to output actuating signals to control the flow of gas to or from the chambers of a single-acting or double-acting pneumatic drive, with the pressure being monitored in at least one pneumatic fluid supply line to the chambers of the drive, and with the position of the final control element being signaled in the positioner by a rotational measuring system, wherein during commissioning, the actuator is moved over a definable distance within its operating range, the pressure in at least one pneumatic fluid supply line to the chambers of the actuator is monitored and recorded, the angle positions fed back by the position feedback sensors are recorded with the corresponding pressures, the drive volumes and the relationship between the drive volumes and the position signal are found from the fed back angle positions and the associated pressures, and are compared with transfer characteristics of known drive types, and where there is a match between the transfer characteristic, defined by the relationship between the drive volumes and the position signal of the given actuator, and one of the transfer characteristics of the known drive types, the identified drive type is assigned to the given actuator.

2. An arrangement for detecting a drive type of an actuator in a process engineering plant, comprising:
- a control element;
- a positioner for operating the control element, the actuator being connected to the positioner by a mounting set, the positioner comprising an electronic control unit, which uses a microcontroller to receive one or more input signals, and to output actuating signals to control the flow of gas to or from the chambers of a single-acting or double-acting pneumatic drive; and
- at least one position feedback sensor equipped with a rotational measuring system, wherein, during commissioning of the actuator, the relationship between drive volumes and a position signal is determined and compared with transfer characteristics of known drive types to identify the drive type to be assigned to the actuator.

3. The arrangement according to claim 2, wherein the comparison is based on ascertaining a match between a transfer characteristic defined by value pairs of the actuator and one of the transfer characteristics of the known drive types to identify the drive type to be assigned to the actuator.

4. The arrangement according to claim 2, wherein the actuator is a pneumatic actuator.

* * * * *